(12) United States Patent
Tri (10) Patent No.: US 11,635,061 B1
(45) Date of Patent: Apr. 25, 2023

(54) CLAMPER PLATE

(71) Applicant: Barr Engineering Co., Minneapolis, MN (US)

(72) Inventor: Brian K. Tri, Minneapolis, MN (US)

( * ) Notice: Subject to any disclaimer, the term of this patent is extended or adjusted under 35 U.S.C. 154(b) by 0 days.

(21) Appl. No.: 17/509,903

(22) Filed: Oct. 25, 2021

(51) Int. Cl.
  *F03D 13/20* (2016.01)
  *E04H 12/08* (2006.01)
  *E02D 27/42* (2006.01)
  *E04B 1/41* (2006.01)

(52) U.S. Cl.
  CPC ............ *F03D 13/22* (2016.05); *E02D 27/425* (2013.01); *E04B 1/4157* (2013.01); *E04H 12/085* (2013.01); *F05B 2230/60* (2013.01)

(58) Field of Classification Search
  CPC ..... F03D 13/22; E02D 27/425; E04H 12/085; F05B 2230/60; E04B 1/4157
  See application file for complete search history.

(56) References Cited

U.S. PATENT DOCUMENTS 8,443,557 B2 * 5/2013 Gevers ................... E02D 27/42
  52/170
2018/0355851 A1 * 12/2018 Brohm ................... F03D 13/22

* cited by examiner

*Primary Examiner* — Andrew J Triggs
(74) *Attorney, Agent, or Firm* — Carlson, Caspers, Vandenburgh & Lindquist, P.A.; Erik Swenson (57) ABSTRACT

A clamper plate for securing a tower having a flange to a pedestal having an embedded first bolt and second bolt is disclosed. The clamper plate includes a first surface coming into contact with the flange and a second surface coming into contact with the pedestal. The clamper plate also includes a first through-hole for receiving the first bolt therethrough and a second through-hole for receiving the second bolt therethrough. During installation the clamper plate is placed over the flange and secured to the pedestal through the first bolt and second bolt.

20 Claims, 8 Drawing Sheets

CLAMPER PLATE

FIELD OF THE DISCLOSURE

The present application relates generally to tower installation, and more particularly to a clamping device for mounting a tower to a pedestal.

BACKGROUND

Today, more than 65,000 wind turbines across the country generate clean, reliable power. Wind power capacity today exceeds 125 Giga Watts, making it the third-largest source of electricity generation capacity in the country. Wind energy (or wind power) refers to the process of creating electricity using the wind or air flows that occur naturally in the earth's atmosphere. Wind turbines capture kinetic energy from the wind and use it to generate electricity. Wind turbines are comprised of rotating blades that are driven by the wind. The rotating blades then turn a shaft connected to a gearbox that converts the blade rotor's low speed, high-torque power into high-speed, low-torque power that is transferred to a generator to generate DC power. The DC power is then converted to AC electricity by power converters and transferred to cables that transmit the power to homes, businesses and other end-users through the power grid.

High amounts of force are exerted on the base of the wind turbine and its mount due to the wind force at the top of the turbine. Thus, the wind turbine must be anchored or mounted to a stable surface. Wind turbines must be mounted to a strong foundation, the underlying structure that transfers the loads to the earth. Larger wind turbines call for taller towers and larger foundations that consume enormous amounts of concrete and rebar. Wind turbine towers can exceed 260 feet in height and the blades can exceed 150 feet in length. As the wind blows across the blades and tower, a tipping force is exerted against the base of the tower. The foundation must resist this force and be stiff enough to keep the tower from rocking or tilting.

Larger wind towers capture more kinetic energy and thus produce more electricity. The longer the turbine blades the more energy a turbine can capture. Generally, doubling the rotor diameter produces a four-fold increase in energy output. Furthermore, the taller the tower is, the more energy it can capture because wind speeds increase with elevation. Therefore, the larger the wind tower, the more efficient it is at producing electricity. However, there are limitations to the size a wind tower can be and still be easily shipped. There are also practical limitations on the diameter and grade of anchor bolts that connect the tower to the foundation. Larger turbines are beginning to push the limit on the practical limits of steel strength. Thus, as wind turbines become larger and larger, improvements to methods and apparatuses of mounting the wind tower to its foundation are desirable without the diameter of the tower getting larger or the required diameter/grade of anchor bolts becoming impractical.

SUMMARY

In a first aspect of the present invention, a clamper plate for securing a tower having a flange to a pedestal having an embedded first bolt and second bolt is disclosed. The clamper plate includes a first surface coming into contact with the flange and a second surface coming into contact with the pedestal. The clamper plate also includes a first through-hole for receiving the first bolt therethrough and a second through-hole for receiving the second bolt therethrough. During installation the clamper plate is placed over the flange and secured to the pedestal through the first bolt and second bolt.

In a second aspect of the present invention, a method of securing a tower having a flange to a pedestal having an embedded first bolt and second bolt is disclosed. The method includes placing the flange on the pedestal and aligning the first bolt with a first through hole in the flange such that the first bolt goes through the first through hole in the flange and extends beyond the flange; placing a clamper plate over the flange and aligning the first bolt with a first through hole in the clamper plate such that the first bolt goes through the first through hole in the clamper plate and extends beyond the clamper plate and aligning the second bolt with a second through hole in the clamper plate such that the second bolt goes through the second through hole in the clamper plate and extends beyond the clamper plate; and securing the flange to the pedestal by tightening nuts to the first bolt and the second bolt such that the clamper plate clamps around the flange of the tower.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE FIGURES

For a more complete understanding of the disclosed system and methods, reference is now made to the following descriptions taken in conjunction with the accompanying drawings.

DETAILED DESCRIPTION

A clamper plate for securing a tower having a flange to a pedestal having an embedded first bolt and second bolt is disclosed. The clamper plate includes a first surface coming into contact with the flange and a second surface coming into contact with the pedestal. The clamper plate also includes a first through-hole for receiving the first bolt therethrough and a second through-hole for receiving the second bolt therethrough. During installation the clamper plate is placed over the flange and secured to the pedestal through the first bolt and second bolt.

Further, a method of securing a tower having a flange to a pedestal having an embedded first bolt and second bolt is disclosed. The method includes placing the flange on the pedestal and aligning the first bolt with a first through hole in the flange such that the first bolt goes through the first through hole in the flange and extends beyond the flange; placing a clamper plate over the flange and aligning the first bolt with a first through hole in the clamper plate such that the first bolt goes through the first through hole in the clamper plate and extends beyond the clamper plate and aligning the second bolt with a second through hole in the clamper plate such that the second bolt goes through the second through hole in the clamper plate and extends beyond the clamper plate; and securing the flange to the pedestal by tightening nuts to the first bolt and the second bolt such that the clamper plate clamps around the flange of the tower.

Figure 1:
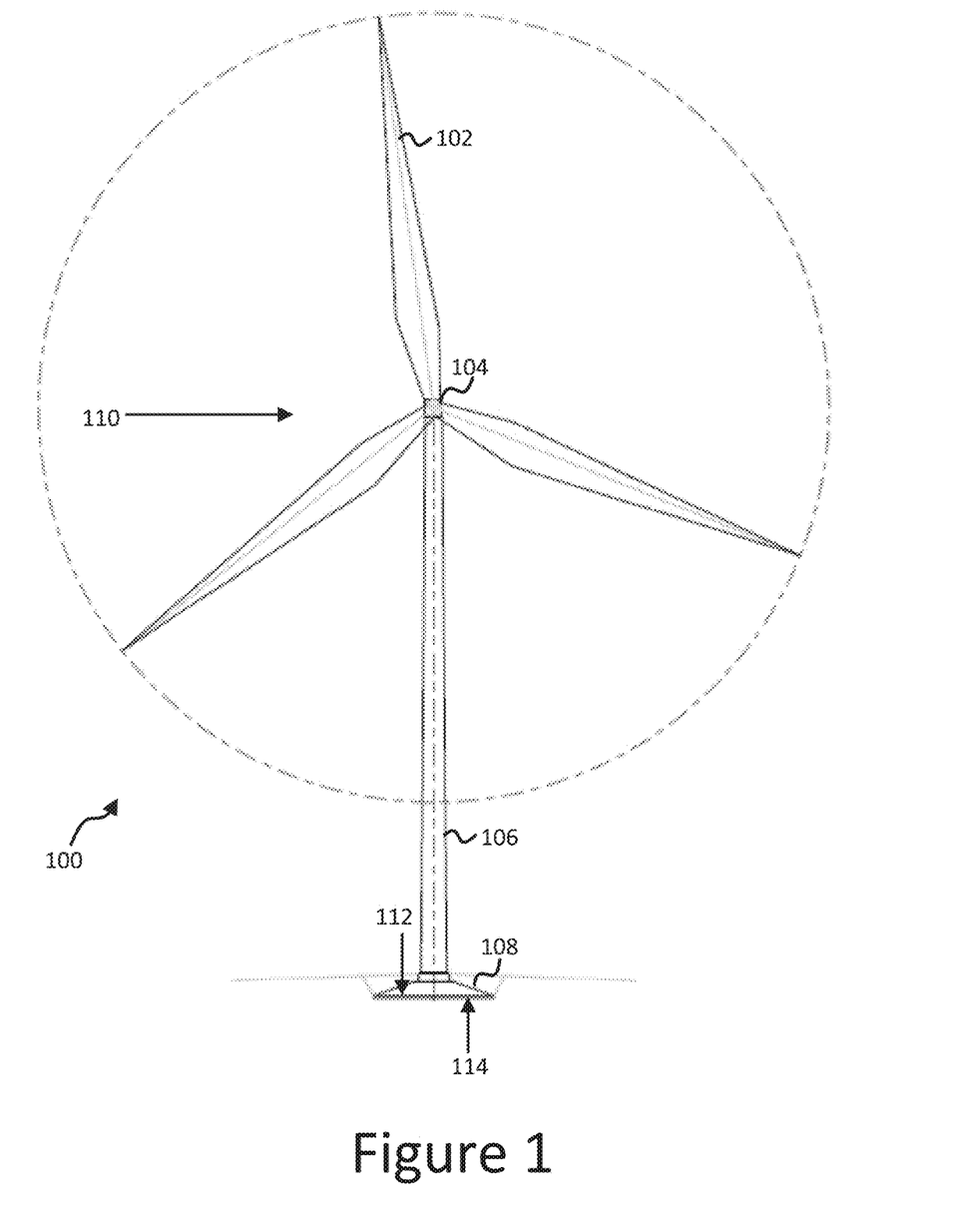
FIG. 1 is a schematic drawing of a wind tower, according to one example embodiment of the present invention.

Referring to FIG. 1, a schematic of a wind tower 100 is shown. The wind tower includes rotating blades 102 connected to a generator 104 mounted to a tower 106. The combination of the blades 102 and the generator 104 is also referred to as a wind turbine. The tower is anchored to a foundation 108. As the wind 110 blows, it exerts a tipping force against the tower and rotates the blades 102. A force 112, including a tipping force from the wind 110 and the weight of the wind tower 100 are exerted against the foundation 108. The earth must resist this force 112 with a soil resistance force 114 such that the tower 100 can stand and not rock in the wind. Thus, the foundation 108 and the mounting of the tower 106 to the foundation 108 must be engineered to resist the force 112 and transfer the loads to the earth.

Figure 2:
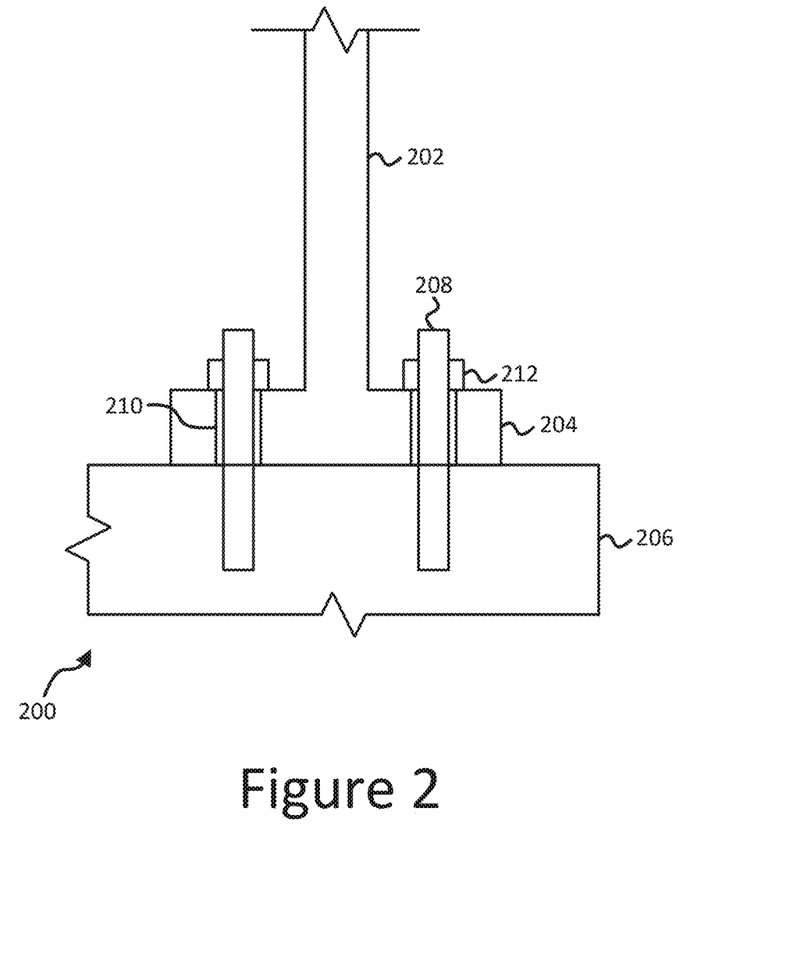
FIG. 2 is a schematic drawing of the wind tower of FIG. 1 anchored to a pedestal, according to one example embodiment of the present invention.

Referring to FIG. 2, a blow-up schematic of a tower base 200 mounted to a concrete pedestal is shown. The wind tower 202 has a base or flange 204. The flange 204 sits on top of a concrete pedestal or foundation 206, often on a bed of leveling grout. The pedestal 206 includes bolts 208 that were embedded into the concrete during formation of the pedestal 206. The bolts 208 are placed to align with through-holes 210 in the flange 204 of the tower 202. The tower 202 is placed on the pedestal 206 such that the bolts 208 extend through the through-holes 210. Nuts 212 are then screwed onto the bolts 208 and tightened to secure the tower 202 to the pedestal 206 during installation.

Figure 3:
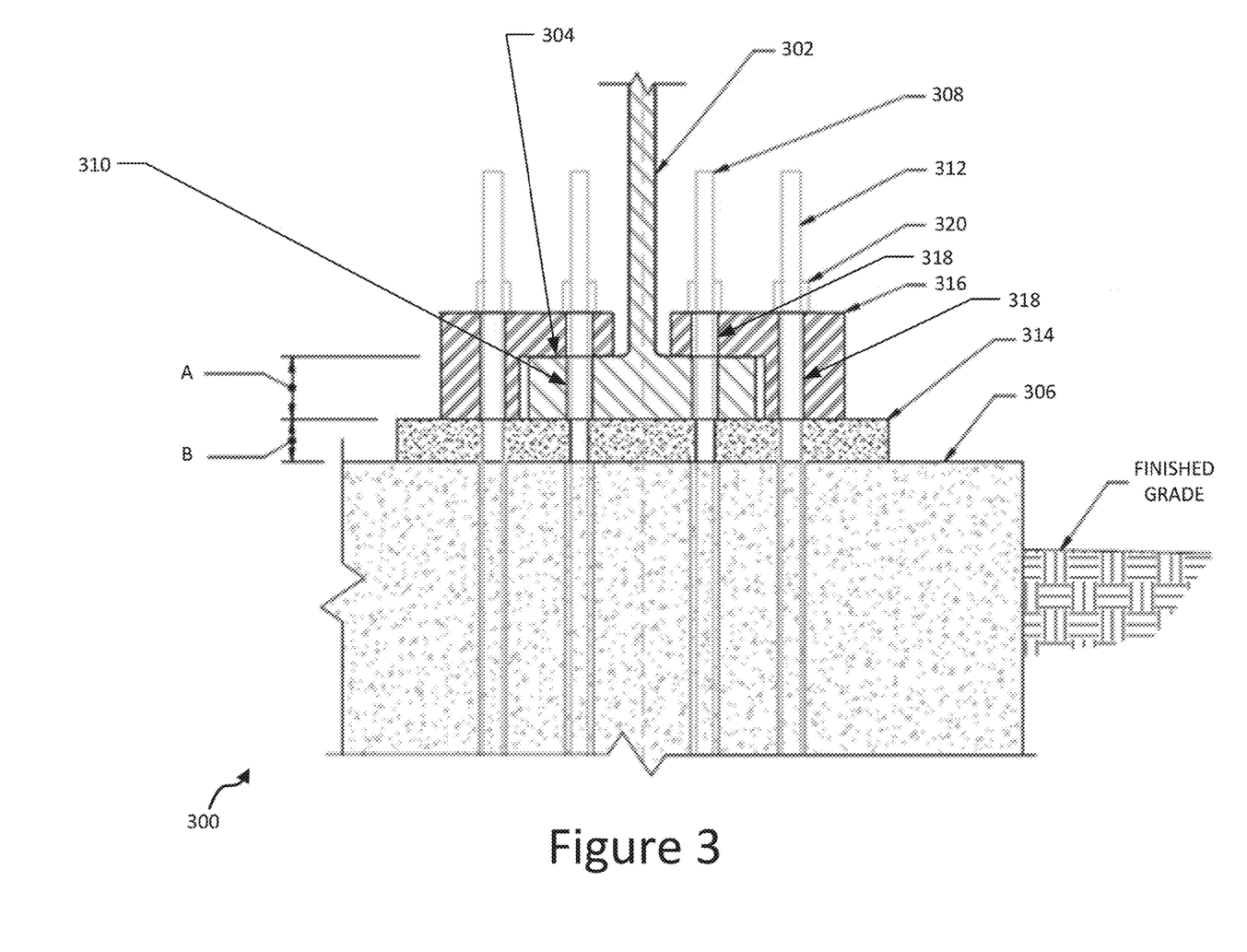
FIG. 3 is a cross sectional view of a tower anchored to a pedestal, according to another example embodiment of the present invention.

Referring to FIG. 3, an improved apparatus 300 and method of connecting or mounting a tower 302 is shown. The wind tower 302 has a base or flange 304. Preferably, the flange 304 has a depth A that is typically between two and six inches. Other depths are also possible. The flange 304 sits on top of a concrete pedestal or foundation 306. The pedestal 306 includes flange bolts 308 that are embedded into the concrete during formation of the pedestal 306. The flange bolts 308 are embedded to align with the through-holes 310 in the flange 304 of the tower 302. The tower 302 is placed on the pedestal 306 such that the flange bolts 308 extend through the through-holes 310. Additional clamper bolts 312 are also embedded into the pedestal 306 during formation of the pedestal 306. Preferably, either a layer of grout 314 or a combination of grout and a steel plate that is wider than the tower flange is placed between the flange 304 and the pedestal 306 to aid in mounting of the tower. Preferably, the grout has a depth B and typically is between one and six inches. Other depths are also possible. It is also possible to mount the tower without using grout 314.

A clamper plate 316 is constructed in an "L" like configuration to go over the flange 304 and come in contact with the additional steel plate or grout 314 (or pedestal 306 if no grout 314 is used). Preferably, the clamper plate 316 is comprised of steel but could be made of any suitable material. The clamper plate 316 also has through-holes 318. The through-holes 318 are constructed to align with the flange bolts 308 and clamper bolts 312. During mounting of the tower 302, the tower 302 is placed on top of the grout 314 and the flange bolts 308 extend through the through holes 310. The clamper plate 316 is then placed over the flange 304 and the flange bolts 308 and clamper bolts 312 extend through the clamper plate 316. Nuts 320 are then screwed onto the flange bolts 308 and clamper bolts 312 and tightened to secure the tower 302 to the pedestal 306 by use of the clamper plate 316.

Figure 4:
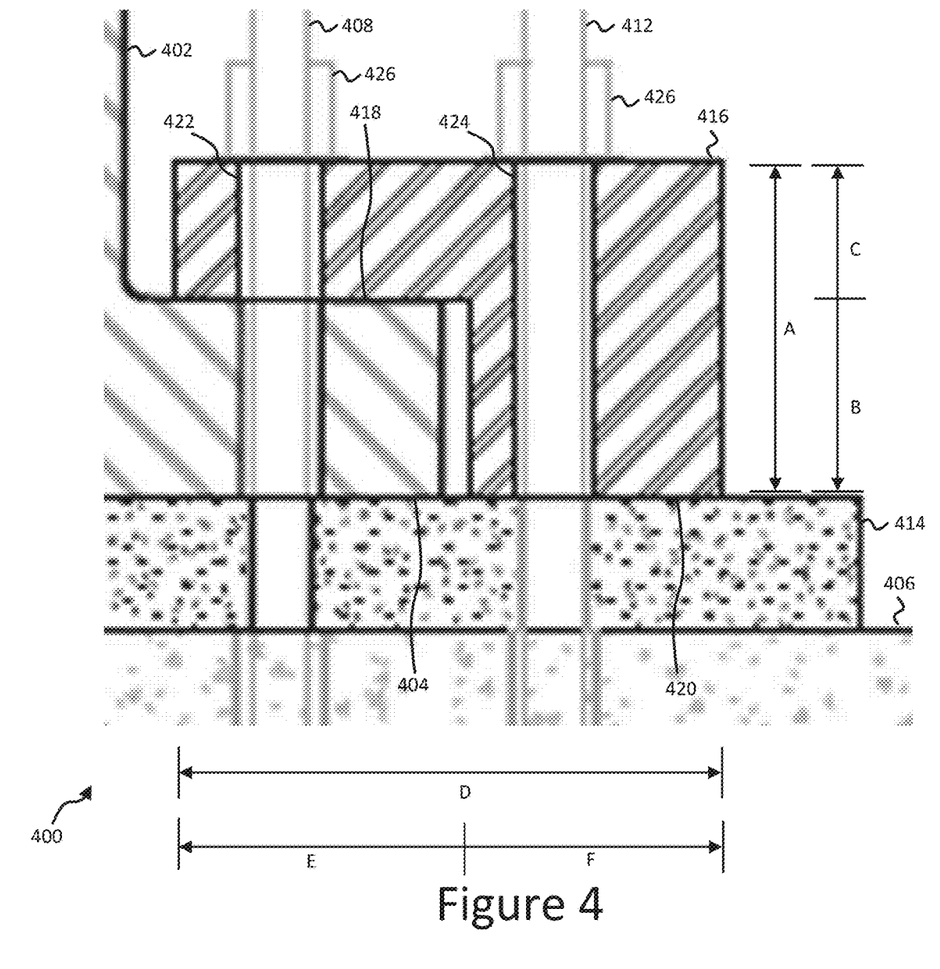
FIG. 4 is a blow up view of a clamper plate, according to one example embodiment of the present invention.

FIG. 4 is an exploded view 400 of a clamper plate 416, such as clamper plate 316 of FIG. 3. The clamper plate 416 is constructed in an "L" like configuration. Preferably, the clamper plate 416 has an overall depth A of between four and twelve inches. Other depths are also possible. The overall depth A includes a depth B and a depth C. Depth B is approximately the same as the depth of a flange 404 of a tower 402. Depth B is typically between 2 and 6 inches. Other depths are also possible. Depth C is designed to cover the flange 404 and is typically between 2 and 6 inches. Other depths are also possible. The clamper plate 416 has a first surface 418 that is designed to go over and come in contact with the flange 404 of the tower 402. The clamper plate 416 also has a second surface 420 that is designed to come in contact with the grout 414 (or pedestal 406 if no grout is used). The clamper plate 416 has an overall width of D of between four and twelve inches. The overall width D includes a width E and a width F. The width E is the width of the first surface 418 that contacts the flange 404 and is typically between two and six inches. Other widths are also possible. The width F is the width of the second surface that contacts the pedestal 406 or grout 414 and is typically between two and six inches. Other widths are also possible.

The clamper plate 416 includes flange through-holes 422 and clamper through-holes 424. The flange through-holes 422 are designed to allow flange bolts 408 to extend therethrough. The clamper through-holes 424 are designed to allow clamper bolts 412 to extend therethrough. During installation, the clamper plate 416 is placed over the flange 404 of the tower 402 and the flange bolts 408 and clamper bolts 412 extend through the through holes 422, 424 respectively. Nuts 426 are screwed onto the flange bolts 408 and clamper bolts 412 and tightened to secure the clamper plate 416 to the flange 404 and the pedestal 406 through the grout 414. In this configuration the clamper plate 416 further clamps the flange 404 of the tower to provide additional support to resist the wind load, such as wind load 110 of FIG. 1. The additional set of embedded clamper bolts 412 allow additional anchoring of the tower 402 without the required diameter/grade of anchor bolts becoming impractical. By using the clamper plate 416, a larger tower size can be accommodated with less expensive and commercially-available anchor bolts and without the need for an even larger pedestal or tower diameter.

Figure 5:
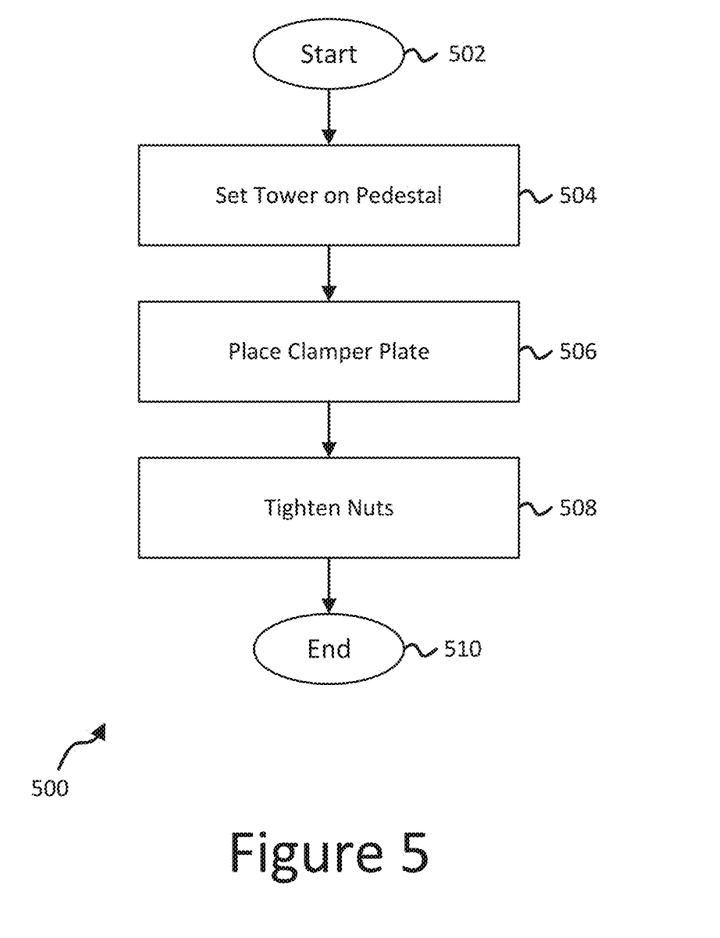
FIG. 5 is a flow diagram of a method of securing a tower to a pedestal, according to one example embodiment of the present invention.

FIG. 5 is a flow diagram of a method 500 of installing a tower on a pedestal. The method begins at 502. At 504, the tower is placed on the pedestal, or grout, such that bolts embedded in the pedestal extend through a flange of the tower. At 506, a clamper plate is placed over the flange such that bolts embedded in the pedestal extend through the clamper plate. At 508 nuts are placed onto the bolts and tightened to clamp the clamper plate down. Flow ends at 510.

Figure 6:
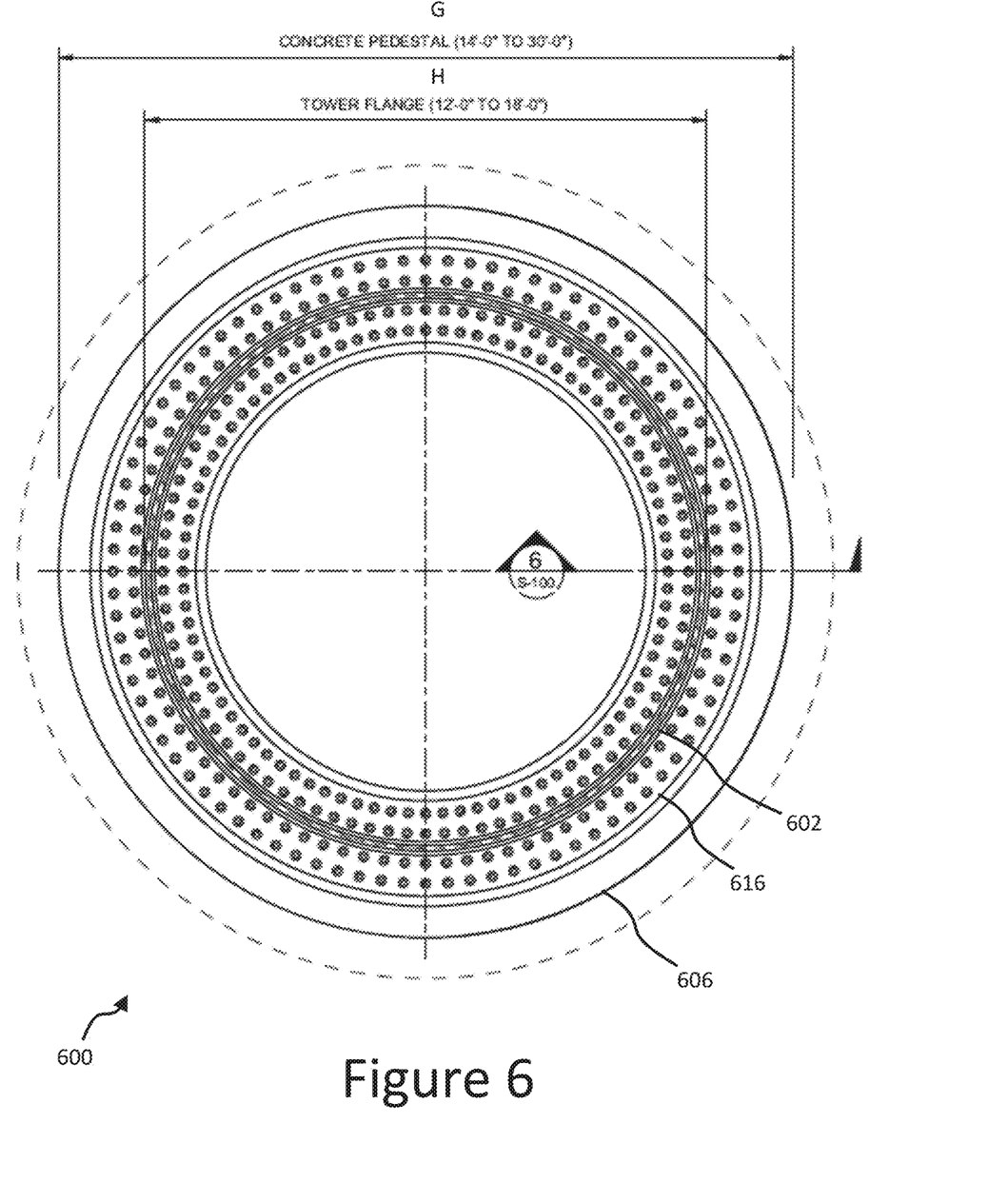
FIG. 6 is a top view of the clamper plate of FIG. 4, according to one example embodiment of the present invention.

FIG. 6 is a top view of a mounted tower 600. A clamper plate 616 is shown anchoring a tower 602 to a concrete pedestal 606. The concrete pedestal 606 has a diameter G that is typically between 14 and 30 feet. The tower 602 has a diameter H that is typically between 12 and 18 feet. A flange of the tower 602 would have a larger diameter than that of the tower 602.

Figure 7:
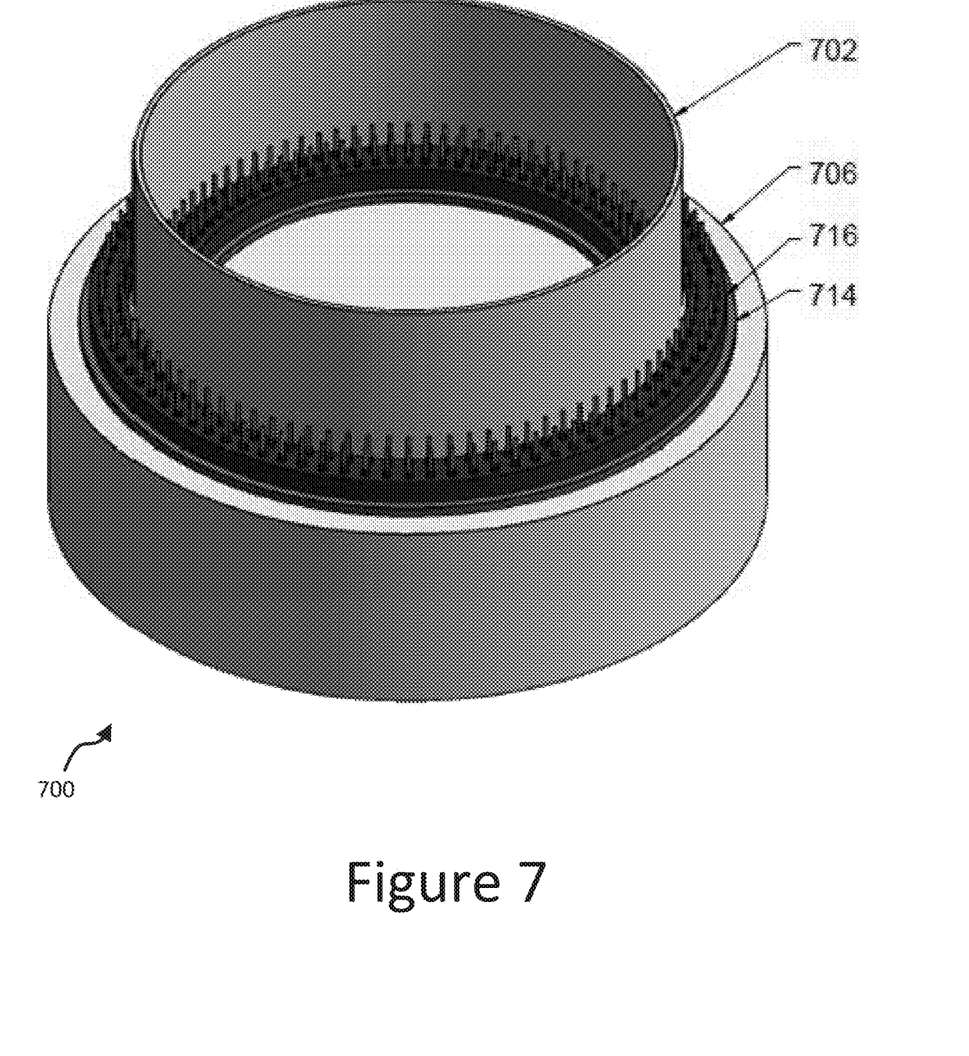
FIG. 7 is an isometric view of a full ring installation, according to one example embodiment of the present invention.
Figure 8:
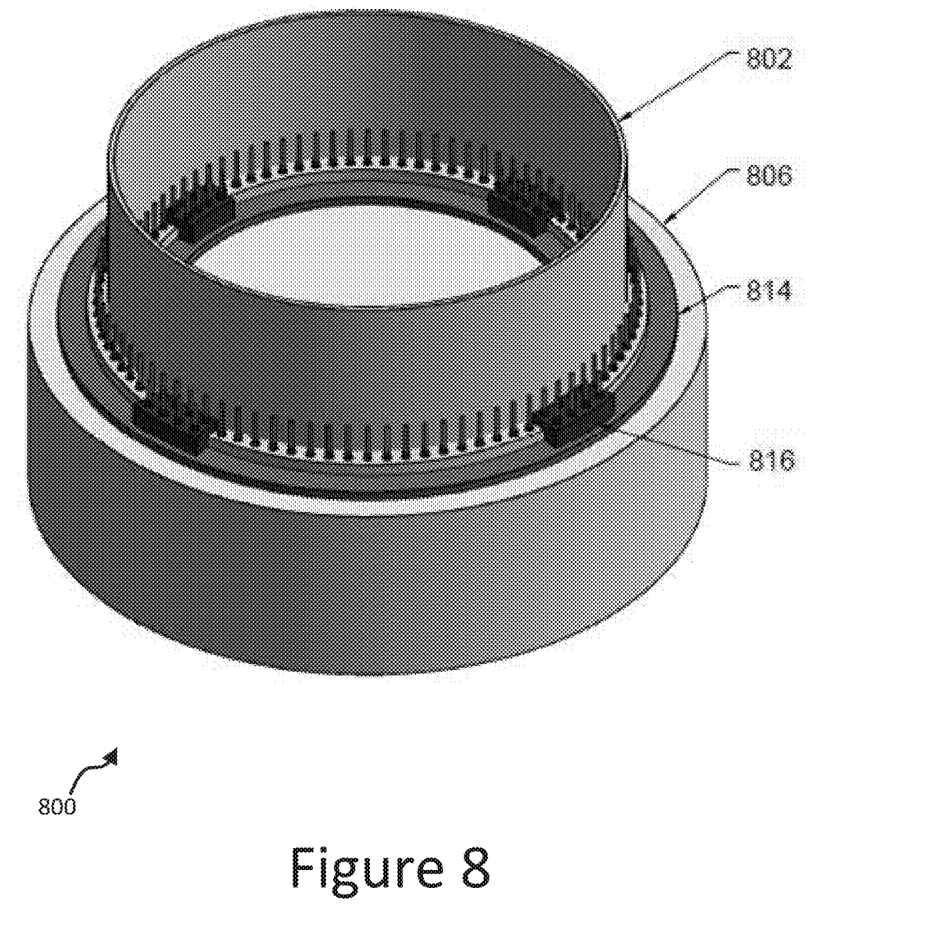
FIG. 8 is an isometric view of a partial ring installation, according to one example embodiment of the present invention.

FIG. 7 is an isometric view of a full ring installation 700 of a clamper plate 716 securing a tower 702 to a pedestal 706 through grout 714. FIG. 8 is an isometric view of a partial ring installation 800 of a clamper plate 816 securing a tower 802 to a pedestal 806 through grout 814. It is noted that in FIG. 8, the clamper plate 816 does not go all the way around the flange 804. The clamper plate 816 can only partially clamp the flange 804 of the tower 802 to the pedestal 806 as shown in FIG. 8 or fully clamp the flange 704 of the tower 702 to the pedestal 706 as shown in FIG. 7.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

I claim:

1. A clamper plate for securing a tower having a flange to a pedestal having an embedded first bolt, the clamper plate comprising:
   a first surface coming into contact with the flange;
   a second surface coming into contact with the pedestal; and
   a first through-hole aligning with a through-hole of the flange for receiving the first bolt therethrough;
   wherein during installation the clamper plate is placed over the flange such that the first through-hole aligns with the through-hole of the flange and is secured to the pedestal by the the first bolt passing through the through-hole of the flange and the first through-hole and a nut attached to the first bolt.

2. The clamper plate of claim 1, wherein the clamper plate has an L shape.

3. The clamper plate of claim 2, wherein the clamper plate has a first depth A of between 4 and 12 inches.

4. The clamper plate of claim 2, wherein the first depth includes a second depth B and a third depth C.

5. The clamper plate of claim 4, wherein the second depth B is approximately equal to the depth of the flange of the tower.

6. The clamper plate of claim 5, wherein the second depth B is between 2 and 6 inches.

7. The clamper plate of claim 6, wherein the third depth C is between 2 and 6 inches.

8. The clamper plate of claim 1, wherein the clamper plate is comprised of steel.

9. The clamper plate of claim 1, wherein the clamper plate has a width of between 4 and 12 inches.

10. The clamper plate of claim 1, wherein the clamper plate is one continuous plate of steel extending around the entire circumference of the tower.

11. The clamper plate of claim 10, wherein the clamper plate extends around the entire circumference of the tower and is made up of multiple pieces of steel.

12. The clamper plate of claim 1, further comprising a second through-hole for receiving a second bolt that secures the clamper plate to the pedestal without passing through the flange of the tower.

13. A method of securing a tower having a flange to a pedestal having an embedded first bolt and second bolt, the method comprising:
   placing the flange on the pedestal and aligning the first bolt with a first through hole in the flange such that the first bolt goes through the first through hole in the flange and extends beyond the flange;
   placing a clamper plate over the flange and aligning the first bolt with a first through hole in the clamper plate such that the first bolt goes through the first through hole in the clamper plate and extends beyond the clamper plate and aligning the second bolt with a second through hole in the clamper plate such that the second bolt goes through the second through hole in the clamper plate and extends beyond the clamper plate; and
   securing the flange to the pedestal by tightening nuts to the first bolt and the second bolt such that the clamper plate clamps around the flange of the tower.

14. The method of claim 13, wherein a layer of grout is placed between the pedestal and the flange prior to placing the flange.

15. The method of claim 13, wherein the clamper plate extends around an entire circumference of the flange.

16. The method of claim 13, wherein the clamper plate only partially extends around an entire circumference of the flange.

17. A method of securing a tower having a flange to a pedestal having an embedded first bolt, the method comprising:
   placing the flange on the pedestal and aligning the first bolt with a first through hole in the flange such that the first bolt goes through the first through hole in the flange and extends beyond the flange;
   placing a clamper plate over the flange and aligning the first bolt with a first through hole in the clamper plate such that the first bolt goes through the first through hole in the clamper plate and extends beyond the clamper plate; and securing the flange to the pedestal by tightening a nut to the first bolt such that the clamper plate clamps around the flange of the tower.

18. The method of claim 17, further comprising aligning a second bolt embedded in the pedestal with a second through hole in the clamper plate such that the second bolt goes through the second through hole in the clamper plate and extends beyond the clamper plate and securing a nut to the second bolt.

19. The method of claim 18, wherein a layer of grout is placed between the pedestal and the flange prior to placing the flange.

20. The method of claim 19, wherein the clamper plate extends around an entire circumference of the flange.

* * * * *